Patented Jan. 15, 1935

1,988,336

UNITED STATES PATENT OFFICE 1,988,336

BITUMINOUS EMULSION AND METHOD OF MAKING SAME

Joseph C. Roediger, Brooklyn, N. Y., assignor, by mesne assignments, to The Patent and Licensing Corporation, New York, N. Y., a corporation of Massachusetts No Drawing. Application August 4, 1932
Serial No. 627,541

4 Claims. (Cl. 134—1)

This invention relates to aqueous emulsions of thermoplastic substances and more particularly to soap type emulsions of such substances as asphalt. Emulsions of this type are used for road building or other purposes in which it is frequently necessary to store the material outdoors during times when freezing might occur.

This invention contemplates the use of a certain emulsifier, which by virtue of its special properties, produces emulsions that are resistant to alternate periods of freezing and thawing at temperatures as low as —40° F.

It has been found that certain rosins containing, as normally produced, relatively high percentages of unsaponifiable material and natural coloring bodies found in rosins, when saponified, produce soaps which may be used as emulsifiers in the production of emulsions. Emulsions produced with this emulsifier under conditions hereinafter more fully described, possess the properties of fine average particle size, greater stability to mechanical action, etc. than emulsions produced with equal quantities of such soaps as are made from such fatty acids as olein; greater fluidity than emulsions of substantially the same average particle size made with the fatty acid soaps, and are entirely stable when subjected to alternate cycles of freezing and thawing—the freezing being conducted at temperatures as low as —40° F.

More specifically, the rosins which I employ in accordance with the invention are the dark, high unsaponifiable content rosins which are sold, for example, under the designation of "B Rosin". This so-called B Rosin is a waste product resulting from the process used in decolorizing rosins. For example, so-called FF Rosin (ruby red in color) is decolorized by being first dissolved in gasoline; a sufficient quantity of furfural is then added. This forms a two liquid layer system in which the furfural layer acts as a selective solvent on the unsaponifiables and coloring bodies in the original FF Rosin used. After proper treatment the furfural layer is separated and distilled to recover the furfural and the residue remaining is the so-called B Rosin. This B Rosin residue contains most of unsaponifiables from the original rosin, and most of the coloring bodies, as well as a good proportion of the rosin acids.

For example the so-called FF Rosin shows an analysis substantially as follows:

| | Percent |
|---|---|
| Unsaponifiables | 5 |
| Coloring bodies—less than | 1 |
| Gasoline insolubles | 8 |
| Rosin (as abietic acid) | 94 |

After treatment such as above described for decolorizing the same, the B Rosin separated from the furfural layer would have an approximate analysis as follows:

| | Percent |
|---|---|
| Unsaponifiables | 10 to 20 |
| Coloring bodies | 1 to 2 |
| Gasoline insolubles | 60 |
| Rosin (as abietic acid) | 79 to 88 |

The gasoline layer is also distilled and yields a yellow rosin containing a small percentage of unsaponifiables, and a very small amount of coloring bodies.

It is thus seen that the selective solvent action distributes the rosin between the two liquid layers and brings the main portion of the unsaponifiables and coloring bodies into the furfural layer.

The unsaponifiables in this B Rosin are designated as "resins" and are generally considered as being difficultly saponifiable esters, high boiling terpenes and terpene derivatives such as sesquiterpenes.

In employing this so-called B Rosin for the manufacture of asphalt emulsions of the type described, it is combined with alkali to form a soap which is then employed in aqueous solutions of certain concentrations as the emulsifying agent for the asphalt, the emulsification being conducted in a standard type of colloid mill, such as a Hurrell mill.

I have found in accordance with the invention, that in using the B Rosin as herein described, it is essential, if the optimum results and particularly the frost-stability are to be attained, that a certain minimum concentration of the B Rosin soap be present in the aqueous phase, and likewise that limited quantities of excess alkali be employed.

The unsaponifiables contained in the B Rosin become gradually saponified upon long contact with excess alkali. Apparently the character and the amount of the unsaponifiables contained in the B Rosin exert an influence which contributes to the attainment of the desirable properties in an asphalt emulsion made therewith, as above described. This at least is indicated by tests showing that emulsions containing as much as 2% excess alkali on the aqueous phase, in time lose the property of withstanding freezings at temperatures of the order of —4° F. followed by thawing without being broken.

For example, various tests on two emulsions of 67% asphalt content, one made with 6% B Rosin potash soap containing 0.5% of free potassium hydroxide on the water phase, and the other with 6% B Rosin potash soap containing 2.4% of free potassium hydroxide on the water phase, show the first emulsion to be stable for sixty weeks after undergoing alternate freezing and thawing cycles, whereas the second emulsion showed a "break-down" after twenty-six weeks of the same type of freezing treatment.

The effect of excessive amounts of excess alkali is even more detrimental in the emulsions made with the sodium soap of B Rosin. For example, a 67% asphalt emulsion having an aqueous phase containing 6.0% of the sodium soap of B Rosin and 0.5% of free, excess sodium hydroxide remained stable to fifty-two weeks of alternate freezings and thawings, whereas a duplicate emulsion containing 1.0% of free excess sodium hydroxide showed break-down after twenty-five weeks of freezings and thawings.

It is extremely important therefore, that the amount of excess alkali present in the soap solution used for emulsifying the asphalt, be carefully regulated. This excess should be sufficient to re-peptize the soap upon thawing of the frozen emulsion, but not so large as to react to any substantial extent with the so-called unsaponifiable or coloring body constituents of the rosin soap. If too little alkali is present, rapid re-peptization of the soap will not take place when the emulsion thaws after having been frozen, and breaking of the emulsion occurs. I have observed that emulsions containing less than 0.1% of free alkali (calculated by weight on the aqueous phase) are not stable to more than four weeks of freezing and thawing and are usually sufficiently unstable to show some break-down even in a one or two day freezing cycle. On the other hand, excessive amounts of free alkali have the detrimental effects already described, and in some cases the presence of a large excess of alkali also causes the salting out of the soap and consequent destruction of the ability of the emulsion to withstand the freezing action without detrimental effects.

In general, it may be stated that the B Rosin soap should be present in amounts not less than 3% and not more than 8%, calculated by weight on the aqueous phase, since quantities in excess of 8% appear to decrease the frost resistance of emulsions so made. Practice has also shown that asphalt emulsions containing 55% to 70% of asphalt and 30% to 45% water with a B Rosin content of 3% to 8% on the aqueous phase, are the most frost resistant when the aqueous phase contains not less than 0.1% and not more than 0.5% of free alkali.

In producing asphalt emulsions of the type herein contemplated, the emulsifying agent may be prepared either by first cooking the B Rosin and the alkali together, or the rosin and alkali may be run hot into the emulsifier together, whereupon emulsification and saponification will take place simultaneously. The soap may be made by the saponification of the B Rosin with potassium hydroxide, sodium hydroxide, potassium carbonate or sodium carbonate.

More specifically illustrating the invention, it may be stated that 65% to 70% asphalt content emulsions are being produced by running the proper amount of asphalt (having a melting point of 100 to 110° F. and penetration of 180 to 200) to the colloid mill at a temperature of 200–250° F. The B Rosin is saponified with alkali, preferably potassium hydroxide. A water solution of this soap is made up to yield 4.5–4.8% of B Rosin soap by titration and the free alkali content is adjusted to 0.1–0.5%. This solution is run to the colloid mill at a temperature of 100–110° F. simultaneously and in a suitable amount with the asphalt, so as to produce an emulsion having 30–35% of water.

This emulsion when subjected to periodic freezing cycles at −4° F. will return to its original condition upon thawing, even after sixty weeks of this treatment. It will also stand several freezing cycles at −40° F. without detrimental effects.

I claim as my invention:

1. A frostproof emulsion of the character described comprising bitumen in the dispersed phase, water in the continuous phase, and from 3 to 8% of B Rosin soap containing 10% to 20% of unsaponifiables as the emulsifying agent, said emulsion containing 0.1% to 0.5% excess of free alkali.

2. A frostproof aqueous bituminous emulsion containing from 3% to 8% of B Rosin soap and from 0.1% to 0.5% of free alkali calculated on the water phase.

3. A frostproof emulsion comprising approximately 65% to 70% of asphalt, 30% to 35% of water, 4.5% of B Rosin soap and .5% of free alkali, both latter calculated on the water phase.

4. A frostproof emulsion comprising bitumen in the dispersed phase, water in the continuous phase, and 3% to 8% by weight calculated on the water phase, of an emulsifying agent comprising saponified rosin containing 10% to 20% of unsaponifiables, said emulsion containing 0.1% to 0.5% of excess alkali.

JOSEPH C. ROEDIGER.